(12) United States Patent
Lin

(10) Patent No.: US 8,687,836 B2
(45) Date of Patent: Apr. 1, 2014

(54) LOUDSPEAKER SYSTEM

(75) Inventor: Lifun Lin, Lincoln, MA (US)

(73) Assignee: Bose Corporation, Framingham, MA (US)

(*) Notice: Subject to any disclaimer, the term of this patent is extended or adjusted under 35 U.S.C. 154(b) by 0 days.

(21) Appl. No.: 13/600,941

(22) Filed: Aug. 31, 2012

(65) Prior Publication Data

US 2014/0064540 A1 Mar. 6, 2014

(51) Int. Cl.
*H04R 1/20* (2006.01)
*H04R 1/28* (2006.01)
*H04R 1/02* (2006.01)

(52) U.S. Cl.
CPC . *H04R 1/28* (2013.01); *H04R 1/025* (2013.01)
USPC .......................................... 381/346; 381/354

(58) Field of Classification Search
CPC ............ H04R 1/02; H04R 1/28; H04R 1/025; H04R 1/288; B01J 20/18; B01J 29/06
USPC .......... 381/337, 345, 346, 354, 386; 181/148, 181/149, 151; 502/67, 87, 73
See application file for complete search history.

(56) References Cited

U.S. PATENT DOCUMENTS

| | | | |
|---|---|---|---|
| 4,356,882 A | 11/1982 | Allen | |
| 4,657,108 A | 4/1987 | Ward | |
| 4,978,650 A | 12/1990 | Coughlin et al. | |
| 5,505,825 A | 4/1996 | Gold et al. | |
| 6,090,477 A | 7/2000 | Burchell et al. | |
| 6,641,648 B2 | 11/2003 | Walker et al. | |
| 7,448,467 B2 | 11/2008 | Wright et al. | |
| 7,463,747 B2 | 12/2008 | Kuze et al. | |
| 7,477,755 B2 | 1/2009 | Saiki et al. | |
| 7,743,877 B2 | 6/2010 | Saiki et al. | |
| 7,743,880 B2 | 6/2010 | Matsumura et al. | |
| 7,840,022 B2 | 11/2010 | Matsumura et al. | |
| 7,953,240 B2 | 5/2011 | Matsumura et al. | |
| 7,974,423 B2 | 7/2011 | Matsumura et al. | |
| 7,991,181 B2 | 8/2011 | Saiki et al. | |
| 2006/0153410 A1 | 7/2006 | Dodd | |
| 2008/0170737 A1 | 7/2008 | Saiki et al. | |
| 2009/0028370 A1 | 1/2009 | Matsumura et al. | |

(Continued)

FOREIGN PATENT DOCUMENTS

| | | |
|---|---|---|
| EP | 2003924 A1 | 12/2008 |
| EP | 2293592 A1 | 9/2011 |

(Continued)

OTHER PUBLICATIONS

Wright, J.R. "The Virtual Loudspeaker Cabinet," Audio Engineering Society Convention Paper 5421, 111th Convention, Sep. 21-24, 2001, New York, USA.

(Continued)

*Primary Examiner* — Tuan D Nguyen
(74) *Attorney, Agent, or Firm* — Brian M. Dingman; Dingman IP Law, PC

(57) ABSTRACT

A loudspeaker system with an enclosure, an electro-acoustic transducer mounted in the enclosure so as to leave space inside of the enclosure that is unoccupied by the transducer, and an air-adsorbing material in the space inside of the enclosure that is unoccupied by the transducer. The air-adsorbing material includes a silicon-based zeolite with a small amount of a second metal. The mole ratio of silicon to the second metal is at least about 200 and is less than 400.

19 Claims, 2 Drawing Sheets

(56) References Cited

U.S. PATENT DOCUMENTS

| | | |
|---|---|---|
| 2009/0245562 A1 | 10/2009 | Saiki et al. |
| 2010/0034411 A1 | 2/2010 | Mellow et al. |
| 2010/0074463 A1 | 3/2010 | Fukunishi et al. |
| 2010/0135516 A1 | 6/2010 | Saiki et al. |
| 2010/0150389 A1 | 6/2010 | Sumiyama et al. |
| 2010/0206658 A1 | 8/2010 | Slotte |
| 2010/0329494 A1 | 12/2010 | Rouvala et al. |
| 2011/0048844 A1 | 3/2011 | Papakyriacou |
| 2013/0170687 A1 | 7/2013 | Papakyriacou et al. |

FOREIGN PATENT DOCUMENTS

| | | |
|---|---|---|
| EP | 2424270 A | 2/2012 |
| GB | 2137608 A | 10/1984 |
| GB | 2391244 A | 2/2004 |
| GB | 2403093 B | 6/2005 |
| JP | 55023039 A | 2/1980 |
| JP | 01226296 A | 9/1989 |
| JP | 2001261319 A | 9/2001 |
| JP | 2003304588 A | 10/2003 |
| JP | 2007288712 A | 11/2007 |
| JP | 2009267580 A | 11/2009 |
| JP | 2009267581 A | 11/2009 |
| JP | 2010045707 A | 2/2010 |
| WO | WO2010095449 A1 | 8/2010 |
| WO | WO2010134312 A1 | 11/2010 |

OTHER PUBLICATIONS

International Search Report and Written Opinion dated Oct. 15, 2013 from PCT Application No. PCT/US2013/057333, filed Aug. 29, 2013 (13 pages).

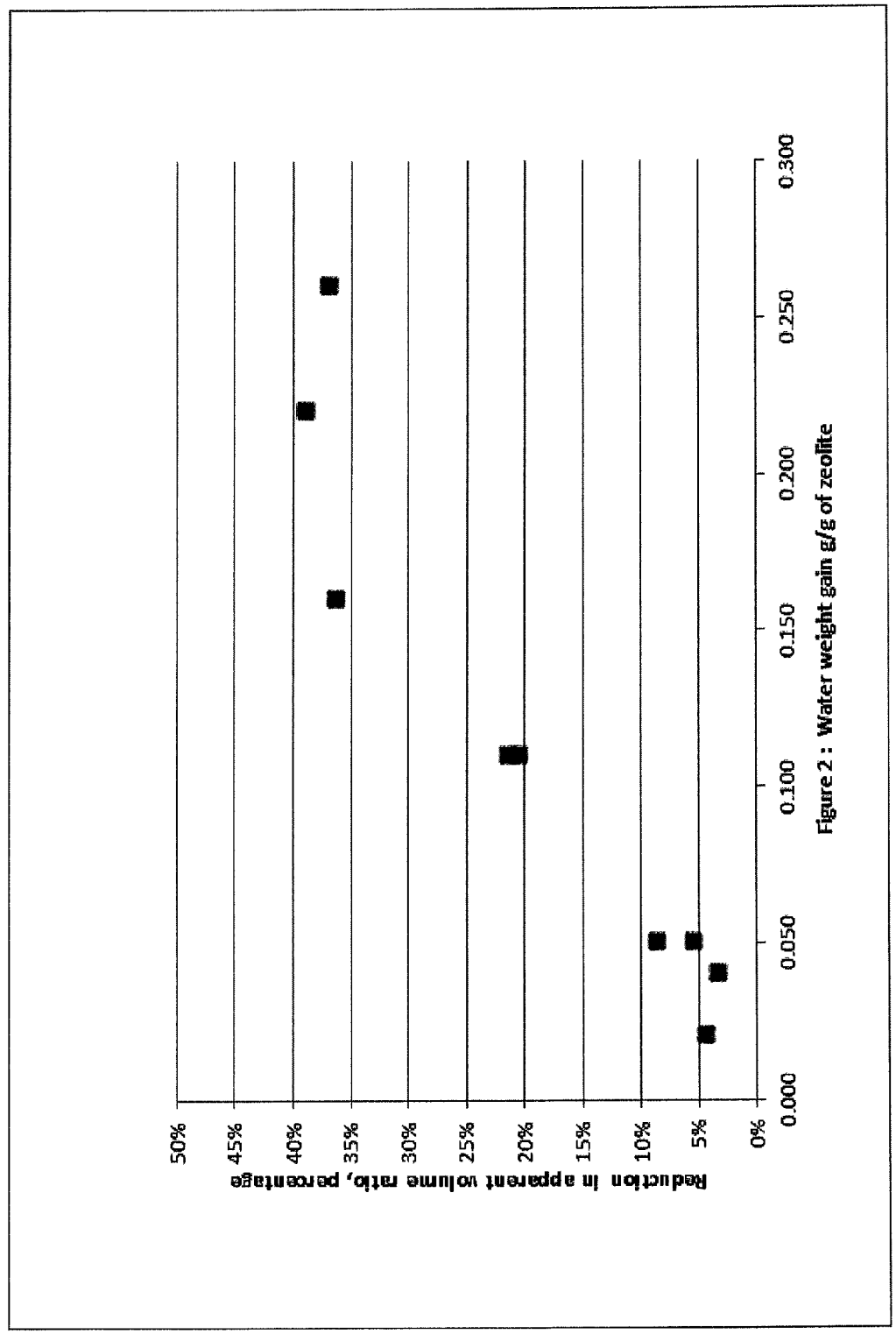

LOUDSPEAKER SYSTEM

FIELD

This disclosure relates to a loudspeaker system.

BACKGROUND

One goal of loudspeaker systems is to achieve a low resonant frequency in a speaker enclosure that has a relatively small internal volume. The resonant frequency of a speaker enclosure can be decreased by adding an air adsorber to the enclosure; the adsorber acts to increase air compliance of the enclosure.

A good adsorption material should have at least the following characteristics. The amount of gas adsorbed and desorbed should be strongly dependent on the pressure change. Also, the adsorption properties of the material should not degrade or change significantly when exposed to different environmental conditions.

Moisture in the atmosphere is one of the key elements detrimental to the proper function of adsorption materials. Often when an adsorption material is exposed to a humid environment many adsorption sites are preferentially occupied by water molecules, leaving few sites for the adsorption/desorption of air molecules. This phenomenon renders the adsorption material ineffective in regulating the pressure of an acoustic enclosure through adsorption/desorption of air inside the enclosure.

Zeolites are silicates that tend to adsorb water vapor from the environment; some zeolites are even used as drying agents. Many zeolites will also adsorb and desorb air from the atmosphere. The adsorption behavior of zeolite depends on both the structure and composition. Aluminum is commonly present in silicate zeolites. Since aluminum has a different oxidation state than silicon (Al is +3 and Si is +4), its presence creates local polar sites. And, since water vapor is polar, zeolites with aluminum tend to preferentially adsorb water vapor over air. Water vapor adsorption decreases the ability of zeolites to adsorb air and accordingly decreases their ability to enhance the acoustic compliance of loudspeaker enclosures.

Highly pure silicate zeolites with a Si/Al mole ratio of over 400 have been proposed for use as air adsorbents in loudspeaker enclosures. Such highly pure zeolites are relatively expensive to manufacture because they require high-purity silica source material; this makes their adoption as adsorbers in loudspeaker enclosures less desirable.

SUMMARY

This disclosure relates to the use of an air adsorbent that is effective to increase the air compliance of a loudspeaker enclosure. The adsorbency is minimally degraded by the presence of humidity. A loudspeaker system that uses the adsorbent thus exhibits long-term increased air compliance without the need to use high-purity adsorbent material or install a cumbersome humidity control system in the speaker enclosure.

In an example, the adsorbent is a silicate zeolite that is made with a moderate amount of aluminum: typically the zeolite has a Si/Al mole ratio of from at least about 200 to less than 400. The silicon source material used to produced such zeolites can be less pure than that required by the highly pure silicate zeolites with Si/Al mole ratios of 400 or greater. The result is a relatively inexpensive loudspeaker enclosure with increased compliance and thus a lower resonant frequency.

When zeolite includes elements such as aluminum that have a different oxidation state than silicon, the zeolite will bind with counter ions to achieve charge neutrality. Commonly these counter ions are cations such as hydrogen ions. The greater the amount of aluminum in the zeolite, the greater the number of such counter cations. When hydrogen ions are present as counter cations, when the zeolite is exposed to water or moisture the water will become acidic; acidic moisture will corrode many metals. The zeolites with this behavior are termed "acidic zeolites" here. Using acidic zeolites in an enclosure can cause corrosion problems in structures such as loudspeaker enclosures that have metal parts. The acidity of silicate zeolites with a second metal such as aluminum can be controlled by judicious choice of counter cations that are not acidic, such as ammonium, alkali metals, alkaline earth metal ions, and metal ions. If the material is too acidic a process such as ion exchange can be employed to reduce the amount of hydrogen ions and replace them with alkaline ions such as ammonium.

One example of the loudspeaker system includes an enclosure, an electro-acoustic transducer mounted in the enclosure so as to leave space inside of the enclosure that is unoccupied by the transducer, and an air-adsorbing material in the space inside of the enclosure that is unoccupied by the transducer. The air-adsorbing material can be a silicon-based zeolite that includes a small amount of a second metal, wherein the mole ratio of silicon to the second metal is at least about 200 and is less than 400. The zeolite can have a molecular structure of the MFI, FER or MEL type. The air-adsorbing material can include one or more types of zeolite. In one non-limiting example, the air-adsorbing material consists entirely of the zeolite. The second metal may be primarily or exclusively aluminum. The second metal may be selected from the group of elements consisting of B, Al, Ti, Ge, Fe, Ga and the rare earth elements. The zeolite may be in powder form.

The zeolite may be configured such that, as compared to the dry state, when exposed to conditions of at least about 90% relative humidity at 40° C. over a period of time until weight gain due to water adsorption is essentially stabilized, the apparent volume ratio achieved with the zeolite measured at 100 Hz decreases by no more than about 10%, and more specifically may be in the range of from about 3% to about 10%.

The air adsorbing material may include counter cations to balance charges of the zeolite due to the presence of the second metal or metalloid. The counter cations may include relatively few hydrogen ions. The counter cations may be selected such that when one part zeolite is mixed with five parts water the pH remains above 4. The air adsorbing material may exhibit an equilibrium water weight gain of less than about 10%, and more preferably may be less than about 7%.

Another example includes a loudspeaker system with an enclosure, an electro-acoustic transducer mounted in the enclosure so as to leave space inside of the enclosure that is unoccupied by the transducer, and an air-adsorbing material in the space inside of the enclosure that is unoccupied by the transducer; the air-adsorbing material comprises a silicon-based zeolite with sufficiently few hydrogen ion counter cations such that when one part zeolite is mixed with five parts water the pH remains above 4. The zeolite may include a small amount of a second metal, wherein the mole ratio of silicon to the second metal is at least about 200 and is less than 400. The second metal may be primarily or exclusively aluminum. The zeolite may have a molecular structure of the MFI, FER or MEL type. As compared to the dry state, when exposed to conditions of at least about 90% relative humidity at 40° C. over a period of time until weight gain due to water adsorption is essentially stabilized, the apparent volume ratio achieved with the zeolite measured at 100 Hz may decrease by no more than about 10%, and more preferably may decrease by from about 3% to about 10%.

Another example includes a loudspeaker system having an enclosure, an electro-acoustic transducer mounted in the enclosure so as to leave space inside of the enclosure that is unoccupied by the transducer, and an air-adsorbing material in the space inside of the enclosure that is unoccupied by the transducer. The air-adsorbing material comprises a silicon-based zeolite that has a molecular structure of the MFI, FER or MEL type and that includes a small amount of aluminum, wherein the mole ratio of silicon to aluminum is at least about 200 and is less than 400. The air adsorbing material further comprises counter cations to balance charges of the zeolite due to the presence of the aluminum, wherein the counter cations are selected such that when one part zeolite is mixed with five parts water the pH remains above 4. As compared to the dry state, when exposed to conditions of at least about 90% relative humidity at 40° C. over a period of time until weight gain due to water adsorption is essentially stabilized, the apparent volume ratio achieved with the zeolite measured at 100 Hz decreases by from about 3% to about 10%. Also, the air adsorbing material exhibits an equilibrium water weight gain of less than about 7% under the subject conditions.

Other features will occur to those skilled in the art and are within the scope of the subject disclosure.

BRIEF DESCRIPTION OF THE DRAWINGS

FIG. 2 is a plot of the reduction of apparent volume ratio as a function of steady state water vapor uptake for various zeolite adsorbents.

DETAILED DESCRIPTION

Figure 1:
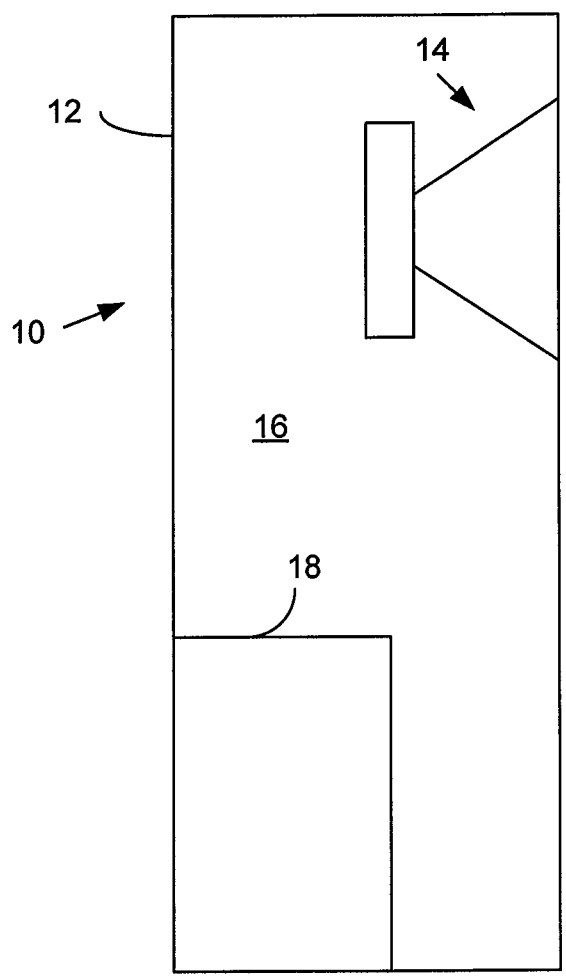
FIG. 1 is a schematic diagram of a loudspeaker system of the present disclosure.

Loudspeaker system 10, FIG. 1, includes enclosure 12. Electro-acoustic transducer 14 is mounted in enclosure 12 so as to project sound from the enclosure while leaving space 16 inside of enclosure 12 that is unoccupied by transducer 14. Air-adsorbing material 18 is located in space or volume 16 inside of enclosure 12 that is unoccupied by transducer 14. Enclosure 12 can be closed, or it can be partially open, e.g., as would be accomplished with one or more ports (not shown).

Material 18 may be a silicon-based zeolite that includes one or more second elements (typically metals or metalloids) such as B, Al, Ti, Ge, Fe, Ga, or a rare earth element in the framework. In one non-limiting example, the mole ratio of silicon to the second element(s) is at least about 200 and is less than 400. Material 18 can consist entirely of zeolite, or zeolite can make up only part of the material. Further, one or more types of zeolite can be included in the zeolite component of material 18. The amount of air absorbing material used in the speaker enclosure and its particle size can be varied, according to need. For example, the material can be present as an un-agglomerated powder, an agglomerated powder, or other forms, shapes and sizes. Generally, more adsorbent in the speaker enclosure leads to greater compliance. However, the cost, weight and volume of the adsorbent are practical factors to be considered. Also, the adsorbent powder should not be packed so tightly as to affect the ability of air molecules to freely adsorb/desorb from the adsorbent.

The air-adsorbing material is preferably a silicon-based zeolite which includes a relatively small amount of one or more additional metals or metalloids; in one case the second metal is aluminum. Zeolites can exist in myriad types of crystal structures, any or all of which may be appropriate for the air adsorbent herein. Types of zeolites that have been shown to be appropriate air adsorbent materials for the subject loudspeaker system include MFI, MEL and FER-type zeolites, where MFI, MEL, and FER are framework code types assigned by the International Zeolite Association.

One way to minimize the sites of alumino-silicate zeolites to which water vapor will readily bind is to increase the $SiO_2/Al_2O_3$ ratio. Since aluminum is a common impurity in the silica source material used in synthesis of zeolites, to achieve high $SiO_2/Al_2O_3$ molar ratio expensive, difficult to source high-purity silica source material is required, and there needs to be strict control of zeolite synthesis so as to minimize Al contamination. The data presented herein helps to establish that for zeolites with a mole ratio of Si to Al of from at least about 200 up to less than 400, the material provides acoustic performance benefit without the need to use high-purity silica source material or to control synthesis conditions as strictly as is necessary to achieve Si:Al mole ratios of 400 or greater. The result is a material that can be readily used in commercial loudspeaker systems. When the subject zeolite has a mole ratio of silicon to the second element in the range of from at least about 200, up to less than 400, it is able to retain up to about 90% of its air absorbency even after extended exposure to high humidity, indicating that the nitrogen binding sites of the zeolite material are not substantially affected by water molecules.

The air compliance increases associated with these materials can be gauged by measuring the increase in the apparent volume of a sealed loudspeaker enclosure with and without the adsorbent material. Air compliance data reported here was obtained by simultaneously measuring the transducer cone displacement and the pressure inside a sealed acoustic box, when signals are applied to transducer. Air compliance is calculated as cone displacement*cone area/pressure. The "apparent volume ratio" equals the air compliance with adsorbent divided by the air compliance without adsorbent; data is set forth in the Table 1 below For each adsorbent, the material was dried at 200° C. until weight loss due to loss of adsorbed water vapor was stabilized. Then the material was cooled to room temperature at 22° C. and about 30% relative humidity. The air compliance was then measured (at 100 Hz) and the apparent volume ratio was calculated. The adsorbent was then exposed to conditions of 40° C.×90% relative humidity (RH) until the weight gain due to water vapor uptake was stabilized, indicating an equilibrium condition. Again the air compliance was measured and the apparent volume ratio calculated. Table 1 presents the two measurements of apparent volume ratio and the decrease of the ratio due to water vapor uptake, calculated as: (dry ratio-ratio after water vapor equilibrium)/dry ratio.

TABLE 1

| Zeolite | Zeolite 1 | Zeolite 2 | Zeolite 3 | Zeolite 4 | Zeolite 5 | Zeolite 6 | Zeolite 7 | Zeolite 8 |
|---|---|---|---|---|---|---|---|---|
| Framework Type | Beta | Beta | MFI | MFI | MFI | MFI | MFI | MFI |

TABLE 1-continued

| Zeolite | Zeolite 1 | Zeolite 2 | Zeolite 3 | Zeolite 4 | Zeolite 5 | Zeolite 6 | Zeolite 7 | Zeolite 8 |
|---|---|---|---|---|---|---|---|---|
| Reported SiO2/Al2O3 molar ratio* | 150 | 300 | 80 | 90 | 240 | 280 | 400 | 1,200 |
| Measured SiO2/Al2O3 molar ratio | 212 | 236 | 91 | 90 | 281 | 284 | 389 | 955 |
| Apparent Volume Ratio at 22° C., 20-30% RH, at 100 Hz | 1.87 | 1.78 | 1.76 | 2.00 | 1.88 | 1.76 | 1.74 | 1.91 |
| Apparent Volume Ratio (after exposure to 40° C., 90% RH until weight gain stabilized), at 100 Hz | 1.18 | 1.08 | 1.40 | 1.57 | 1.72 | 1.68 | 1.68 | 1.82 |
| Reduction in Apparent Volume Ratio due to moisture saturation, % | −37% | −39% | −21% | −21% | −9% | −5% | −3% | −5% |

*data reported by material supplier

These data establish that the apparent volume ratio of zeolite material with a Si/Al mole ratio of from about 200 up to about 400 drops by only from about 3% to about 10% due to water vapor absorption under the stated conditions, as compared to a drop in the range of 20% for MFI zeolite with Si/Al ratio of less than 100 after they reached equilibrium under the stated conditions. Zeolite with a different structure but the same Si/Al ratio can have a different degree of compliance impact. For example, after a similar humidity test, zeolite with a beta structure lost much more air compliance (about 40%) than the MFI structure at a similar level of Si/Al. Thus, the benefit obtained in compliance increase of zeolite adsorbents when exposed to humidity is dependent on the zeolite structure as well as the mole ratio of Si to Al.

The molar ratios herein, including those set forth in Table 1, can also be expressed as the equivalent Si:Al mass ratios. For example, from Table 1, Zeolite 6 has a molar ratio (measured) of 284. This ratio reflects 284 Si per two Al. The molar ratio can be converted to an elemental ratio by dividing by two. Thus a molar ratio of 284 equals a Si:Al elemental ratio of 142. The elemental ratio can be converted to mass ratio by multiplying by the ratio of molecular weights. The molecular weight of Si is 28.0885 and that of Al is 26.988. So again for Zeolite 6, 142 times 28.0885 divided by 26.988 equals a Si:Al mass ratio of 147.79.

FIG. 2 is a plot of the reduction in apparent volume ratio (from dry to equilibrated state after exposure to 40° C., 90% relative humidity conditions until the weight gain is essentially stabilized) as a function of steady state water vapor uptake for several zeolite adsorbents. These data establish that for materials that exhibit an equilibrium water weight gain under the stated conditions of less than about 10%, and preferably less than about 7%, the apparent volume ratio difference is very small—less than about 10%.

Since activated carbon is a common adsorbent, we compare the performance of zeolite to that of activated carbon. Table 2 compares the (apparent) volume ratio of an acoustic box containing an MFI silicate zeolite (zeolite 6 in Table 1) to that of BPL 6×16 mesh activated carbon from Calgon, in both the dry state and when equilibrated to 40° C., 90% RH. The loading of adsorbents in the loudspeaker box was about 35-40 volume %. The performance was compared at 10 Hz. The activated carbon is shown to be essentially ineffective at increasing compliance, while the zeolite has only about a 5% decay in performance, even though the exposure time of Zeolite to the humid environment is much longer.

TABLE 2

| Material | Zeolite 6 | Activated Carbon (6 × 16 mesh) |
|---|---|---|
| Apparent Volume Ratio at 22° C., 20-30% RH, at 10 Hz | 1.76 | 1.80 |
| Apparent Volume Ratio (after exposure to 40° C., 90% RH until weight gain stabilized), at 10 Hz | 1.68 | 1.05 |
| Reduction in Apparent Volume Ratio due to moisture saturation, % | −5% | −42% |

When the second elements in the silicate zeolite are of different valance from silicon, the zeolite will not be neutrally charged and so will contain charged counter ions such as alkali metals, ammonium, hydrogen ions, metal ions, or mixtures thereof that act to balance the charge of the zeolite. The counter ion influences the acidity of zeolite. The acidity of zeolite was determined by mixing one part zeolite to five parts of water and measuring the resulting pH. It is desirable to use a zeolite with a pH greater than 4 as measured in this manner, so as to reduce any tendency of the zeolite to corrode metal inside the speaker enclosure. For example, zeolite 6 (Tables 1 and 2) includes ammonium counter cations and its pH is 7. The counter cations in this same zeolite become hydrogen ions if the material is heat treated in air at 600° C., and in turn the pH of this zeolite decreases to 3.2. It has been determined that potential corrosion caused by such acidic zeolites is decreased when its pH, as measured per the above procedure, is above 4.

Other embodiments will occur to those skilled in the field from the above description and are within the scope of the claims.

What is claimed is:

1. A loudspeaker system, comprising:
an enclosure;
an electro-acoustic transducer mounted in the enclosure so as to leave space inside of the enclosure that is unoccupied by the transducer; and
an air-adsorbing material in the space inside of the enclosure that is unoccupied by the transducer, wherein the air-adsorbing material comprises a silicon-based zeolite that includes a small amount of a second metal, wherein the mass ratio of silicon to the second metal is less than 200.

2. The loudspeaker system of claim 1 wherein the zeolite has a molecular structure of the MFI, FER or MEL type.

3. The loudspeaker system of claim 1 wherein the air-adsorbing material comprises more than one type of zeolite.

4. The loudspeaker system of claim 1 wherein the air-adsorbing material consists entirely of the zeolite.

5. The loudspeaker system of claim 1 wherein as compared to the dry state, when exposed to conditions of at least about 90% relative humidity at 40° C. until weight gain due to water adsorption is essentially stabilized, the apparent volume ratio achieved with the zeolite measured at 100 Hz decreases by no more than about 10%.

6. The loudspeaker system of claim 1 wherein as compared to the dry state, when exposed to conditions of at least about 90% relative humidity at 40° C. until weight gain due to water adsorption is essentially stabilized, the apparent volume ratio achieved with the zeolite measured at 100 Hz decreases by from about 3% to about 10%.

7. The loudspeaker system of claim 1 wherein the second metal is primarily or exclusively aluminum.

8. The loudspeaker system of claim 1 wherein the second metal is selected from the group of elements consisting of B, Al, Ti, Ge, Fe, Ga and the rare earth elements.

9. The loudspeaker system of claim 1 wherein the zeolite is in powder form.

10. The loudspeaker system of claim 1 wherein the air adsorbing material further comprises counter cations to balance charges of the zeolite due to the presence of the second metal.

11. The loudspeaker system of claim 10 wherein the counter cations are selected such that when one part zeolite is mixed with five parts water the pH remains above 4.

12. The loudspeaker system of claim 1 wherein the air adsorbing material exhibits a weight gain due to water vapor adsorption of less than about 10% after exposure to 40° C., 90% relative humidity conditions until the weight gain is essentially stabilized.

13. The loudspeaker system of claim 12 wherein the air adsorbing material exhibits a an equilibrated weight gain due to water vapor adsorption of less than about 7%.

14. A loudspeaker system, comprising:
an enclosure;
an electro-acoustic transducer mounted in the enclosure so as to leave space inside of the enclosure that is unoccupied by the transducer; and
an air-adsorbing material in the space inside of the enclosure that is unoccupied by the transducer, wherein the air-adsorbing material comprises a silicon-based zeolite with sufficiently few hydrogen ion counter cations such that when one part zeolite is mixed with five parts water the pH remains above 4, wherein the zeolite comprises a small amount of a second metal, wherein the mass ratio of silicon to the second metal is less than 200.

15. The loudspeaker system of claim 14 wherein the zeolite has a molecular structure of the MFI, FER or MEL type.

16. The loudspeaker system of claim 14 wherein as compared to the dry state, when exposed to conditions of at least about 90% relative humidity at 40° C. until weight gain due to water adsorption is essentially stabilized, the apparent volume ratio achieved with the zeolite measured at 100 Hz decreases by no more than about 10%.

17. The loudspeaker system of claim 14 wherein as compared to the dry state, when exposed to conditions of at least about 90% relative humidity at 40° C. until weight gain due to water adsorption is essentially stabilized, the apparent volume ratio achieved with the zeolite measured at 100 Hz decreases by from about 3% to about 10%.

18. The loudspeaker system of claim 14 wherein the second metal is primarily or exclusively aluminum.

19. A loudspeaker system, comprising:
an enclosure;
an electro-acoustic transducer mounted in the enclosure so as to leave space inside of the enclosure that is unoccupied by the transducer;
an air-adsorbing material in the space inside of the enclosure that is unoccupied by the transducer, wherein the air-adsorbing material comprises a silicon-based zeolite that has a molecular structure of the MFI, FER or MEL type and that includes a small amount of aluminum, wherein the mass ratio of silicon to aluminum is less than 200, wherein the air adsorbing material further comprises counter cations to balance charges of the zeolite due to the presence of the aluminum, and wherein the counter cations are selected such that when one part zeolite is mixed with five parts water the pH remains above 4;
wherein as compared to the dry state, when exposed to conditions of at least about 90% relative humidity at 40° C. until weight gain due to water adsorption is essentially stabilized, the apparent volume ratio achieved with the zeolite measured at 100 Hz decreases by from about 3% to about 10%; and
wherein the air adsorbing material exhibits a weight gain due to water vapor adsorption of less than about 7% after exposure to 40° C., 90% relative humidity conditions until the weight gain is essentially stabilized.

* * * * *